(12) United States Patent
Yazici et al.

(10) Patent No.: US 12,716,386 B1
(45) Date of Patent: Aug. 25, 2026

(54) ATTACHMENT FOR MOUNTING AIRCRAFT PROPULSION SYSTEM TO PYLON STRUCTURE

(71) Applicant: RTX Corporation, Farmington, CT (US)

(72) Inventors: Murat Yazici, Glastonbury, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/259,782

(22) Filed: Jul. 3, 2025

(51) Int. Cl.
*F02C 7/20* (2006.01)

(52) U.S. Cl.
CPC .......... *F02C 7/20* (2013.01); *F05D 2220/323* (2013.01); *F05D 2240/90* (2013.01)

(58) Field of Classification Search
CPC ...... B64D 27/404; B64D 27/02; B64D 27/40; F01D 25/28; F05D 2240/90; F02C 7/20
See application file for complete search history.

(56) References Cited

U.S. PATENT DOCUMENTS 4,044,973 A 8/1977 Moorehead
5,303,880 A * 4/1994 Cencula ................ B64D 27/40 244/54
6,209,822 B1 4/2001 Le Blaye
7,165,743 B2 1/2007 Pasquer
9,193,467 B2 11/2015 Barnes
11,697,506 B2 * 7/2023 Schelfaut ............ B64D 27/406 244/54
2011/0308257 A1 12/2011 Vauchel
2015/0175268 A1 * 6/2015 Guillou ............... B64D 27/404 244/54
2019/0315477 A1 * 10/2019 Geliot ................. B64D 27/404
2021/0039799 A1 * 2/2021 Sharma ............... B64D 27/406

* cited by examiner

*Primary Examiner* — Rodolphe Andre Chabreyrie
(74) *Attorney, Agent, or Firm* — Getz Balich LLC

(57) ABSTRACT

An aircraft system includes a turbine engine case and an attachment. The turbine engine case includes a sidewall, a first mount and a second mount. The first mount and the second mount are radially outboard of and fixed to the sidewall. The second mount is circumferentially offset from the first mount about the axis. The attachment is configured to mount the turbine engine case to a pylon structure and transfer one or more loads between the turbine engine case and the pylon structure. The attachment comprises a bracket. The bracket is mounted to the first mount through a first mount-bracket pin connection. The first mount-bracket pin connection includes a first mount-bracket connection pin seated in a first mount-bracket connection aperture having an elongated cross-sectional geometry in a reference plane perpendicular to the axis. The bracket is mounted to the second mount through a second mount-bracket pin connection.

17 Claims, 12 Drawing Sheets

ATTACHMENT FOR MOUNTING AIRCRAFT PROPULSION SYSTEM TO PYLON STRUCTURE

BACKGROUND OF THE DISCLOSURE

1. Technical Field

This disclosure relates generally to an aircraft and, more particularly, to mounting an aircraft propulsion system to a pylon structure.

2. Background Information

Various types and configurations of propulsion systems are known in the art for an aircraft. Various types and configurations of attachments are also known in the art for mounting an aircraft propulsion system to a pylon structure. While these known aircraft propulsion systems and mounting attachments have various benefits, there is still room in the art for improvement.

SUMMARY OF THE DISCLOSURE

According to an aspect of the present disclosure, a system is provided for an aircraft. This system includes a turbine engine case and an attachment. The turbine engine case includes a sidewall, a first mount and a second mount. The sidewall extends axially along and circumferentially about an axis. The first mount and the second mount are radially outboard of and fixed to the sidewall. The second mount is circumferentially offset from the first mount about the axis. The attachment is configured to mount the turbine engine case to a pylon structure and transfer one or more loads between the turbine engine case and the pylon structure. The attachment comprises a bracket. The bracket is mounted to the first mount through a first mount-bracket pin connection. The first mount-bracket pin connection includes a first mount-bracket connection pin seated in a first mount-bracket connection aperture having an elongated cross-sectional geometry in a reference plane perpendicular to the axis. The bracket is mounted to the second mount through a second mount-bracket pin connection.

According to another aspect of the present disclosure, another system is provided for an aircraft. This system includes a plurality of vanes, a turbine engine case and an attachment. The vanes are arranged circumferentially about an axis in an array. The vanes include a first vane and a second vane. The turbine engine case circumscribes and is connected to the array of the vanes. The turbine engine case includes a first mount and a second mount. The first mount is axially and circumferentially aligned with the first vane. The second mount is axially and circumferentially aligned with the second vane. The attachment is configured to mount the turbine engine case to a pylon structure and transfer one or more loads between the turbine engine case and the pylon structure. The attachment comprises a bracket. The bracket is mounted to the first mount through a first mount-bracket pin connection. The first mount-bracket pin connection includes a first mount-bracket connection pin arranged within five degrees of parallel to the axis. The bracket is mounted to the second mount through a second mount-bracket pin connection. The second mount-bracket pin connection includes a second mount-bracket connection pin arranged within five degrees of parallel to the axis.

According to still another aspect of the present disclosure, another system is provided for an aircraft. This system includes a turbine engine case, a pylon structure and an attachment. The turbine engine case includes a sidewall, a first mount and a second mount. The sidewall extends axially along and circumferentially about an axis. The first mount and the second mount are radially outboard of and fixed to the sidewall. The second mount is circumferentially offset from the first mount about the axis. The pylon structure is located radially outboard of the turbine engine case. The attachment is configured to mount the turbine engine case to the pylon structure and transfer one or more loads between the turbine engine case and the pylon structure. The attachment comprises a bracket. The bracket is mounted to the pylon structure through a pylon-bracket pin connection such that the attachment is operable to pivot about the pylon-bracket pin connection and move relative to the pylon structure. The bracket is mounted to the first mount through a first mount-bracket pin connection. The first mount-bracket pin connection includes a first mount-bracket connection pin arranged within five degrees of parallel to the axis. The bracket is mounted to the second mount through a second mount-bracket pin connection. The second mount-bracket pin connection includes a second mount-bracket connection pin arranged within five degrees of parallel to the axis.

The bracket may be configured to mount to the pylon structure through a pylon-bracket pin connection such that the attachment is operable to pivot about the pylon-bracket pin connection and move relative to the pylon structure.

A reference line may project radially out from the axis. The elongated cross-sectional geometry of the first mount-bracket connection aperture may include a major axis and a minor axis. The major axis may be within five degrees of parallel with the reference line within the reference plane.

A reference line may be coincident with a center of the first mount-bracket pin connection and a center of the second mount-bracket pin connection in the reference plane. The elongated cross-sectional geometry of the first mount-bracket connection aperture may include a major axis and a minor axis. The major axis may be within five degrees of parallel with the reference line within the reference plane.

The bracket may include the first mount-bracket connection aperture.

The second mount-bracket pin connection may include a second mount-bracket connection pin seated in a second mount-bracket connection aperture having a circular cross-sectional geometry in the reference plane.

The first mount may be configured as or otherwise include a first clevis. The bracket may be received in a first channel in the first clevis. The first mount-bracket pin connection may attach the bracket to the first clevis. In addition or alternatively, the second mount may be configured as or otherwise include a second clevis. The bracket may be received in a second channel in the second clevis. The second mount-bracket pin connection may attach the bracket to the second clevis.

The system may also include a plurality of vanes arranged circumferentially about the axis in an array. Each of the vanes may be fixed to the turbine engine case. The turbine engine case may circumscribe the array of the vanes. The first mount-bracket pin connection may be circumferentially aligned with a first of the vanes. The second mount-bracket pin connection may be circumferentially aligned with a second of the vanes.

The turbine engine case may also include a third mount fixed to the sidewall. The third mount may be arranged circumferentially between the first mount and the second mount about the axis. The bracket may be mounted to the third mount through a third mount-bracket pin connection. The third mount-bracket pin connection may be circumferentially aligned with a third of the vanes.

The first of the vanes may be circumferentially next to the second of the vanes. The turbine engine case may also include a third mount fixed to the sidewall. The third mount may be arranged circumferentially between the first mount and the second mount about the axis. The bracket may be mounted to the third mount through a third mount-bracket pin connection.

The first of the vanes may be circumferentially next to the second of the vanes.

A third of the vanes may be circumferentially between and next to the first of the vanes and the second of the vanes.

The vanes may be uniformly arranged circumferentially about the axis in the array.

The vanes may be non-uniformly arranged circumferentially about the axis in the array.

The turbine engine case may also include a third mount fixed to the sidewall. The third mount may be arranged circumferentially between the first mount and the second mount about the axis. The bracket may be mounted to the third mount through a third mount-bracket pin connection. The third mount-bracket pin connection may include a third mount-bracket connection pin seated in a third mount-bracket connection aperture having a circular cross-sectional geometry in the reference plane. A diameter of the third mount-bracket connection aperture may be equal to or greater than 1.1 times a diameter of the third mount-bracket connection pin.

The first mount-bracket connection pin may have a solid cross-section in the reference plane. The first mount-bracket connection pin may contact the first mount and the bracket in the reference plane. In addition or alternatively, the second mount-bracket pin connection may include a second mount-bracket connection pin seated in a second mount-bracket connection aperture. The second mount-bracket connection pin may have a solid cross-section in the reference plane. The second mount-bracket connection pin may contact the second mount and the bracket in the reference plane.

Another first mount-bracket connection pin may project through a bore of the first mount-bracket connection pin. Alternatively, the second mount-bracket pin connection may include a second mount-bracket connection pin seated in a second mount-bracket connection aperture. Another second mount-bracket connection pin may project through a bore of the second mount-bracket connection pin.

The turbine engine case may be configured as or otherwise include an inner turbine engine case. The system may also include an outer turbine engine case, a propulsor rotor and a turbine engine core. The propulsor rotor may be housed within the outer turbine engine case. The turbine engine core may be housed within the inner turbine engine case. The turbine engine core may be configured to drive rotation of the propulsor rotor.

The system may also include a ducted propulsor engine including the turbine engine case and a turbine engine core housed within the turbine engine case. The attachment may be configured as an aft-most attachment configured to mount the ducted propulsor engine to the pylon structure.

The system may also include an open propulsor engine including the turbine engine case and a turbine engine core housed within the turbine engine case. The attachment may be configured as an aft-most attachment configured to mount the open propulsor engine to the pylon structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
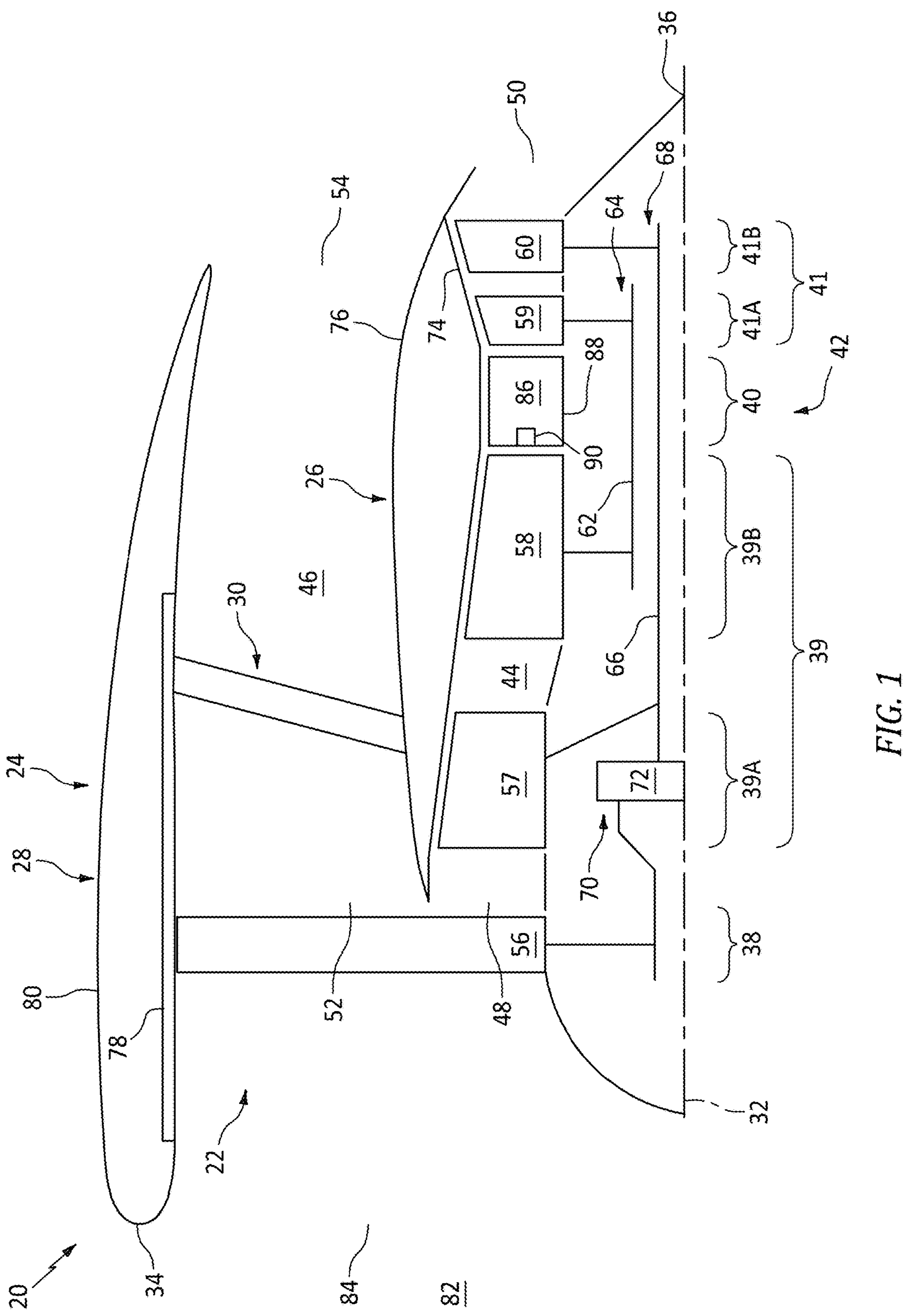
FIG. 1 is a partial side schematic illustration of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. For ease of description, the aircraft propulsion system 20 is described below as a turbofan propulsion system. The aircraft propulsion system 20 of the present disclosure, however, is not limited to such an exemplary propulsion system. The aircraft propulsion system 20, for example, may alternatively be configured as a turbojet propulsion system, a turboprop propulsion system, a turboshaft propulsion system, a propfan propulsion system, a pusher fan propulsion system, or any other type of ducted and/or open propulsor rotor propulsion system.

The aircraft propulsion system 20 includes a gas turbine engine 22 (e.g., a turbofan engine) housed within a stationary propulsion system housing 24, which propulsion system housing 24 of FIG. 1 includes an inner housing structure 26, an outer housing structure 28 and a guide vane structure 30 (e.g., a fan exit guide vane (FEGV) structure) extending radially between and connected to the inner housing structure 26 and the outer housing structure 28. The aircraft propulsion system 20 extends axially along an axis 32 of the aircraft propulsion system 20 between an axial upstream, forward end 34 of the aircraft propulsion system 20 and an axial downstream, aft end 36 of the aircraft propulsion system 20. Briefly, the propulsion system axis 32 may be a centerline axis of the aircraft propulsion system 20, the turbine engine 22 and/or one or more of its members. The propulsion system axis 32 may also or alternatively be a rotational axis for one or more members of the turbine engine 22.

The aircraft propulsion system 20 and its turbine engine 22 of FIG. 1 include a propulsor section 38 (e.g., a fan section), a compressor section 39, a combustor section 40 and a turbine section 41. The compressor section 39 of FIG. 1 includes a low pressure compressor (LPC) section 39A and a high pressure compressor (HPC) section 39B. The turbine section 41 of FIG. 1 includes a high pressure turbine (HPT) section 41A and a low pressure turbine (LPT) section 41B. At least (or only) the LPC section 39A, the HPC section 39B, the combustor section 40, the HPT section 41A and the LPT section 41B collectively form a core 42 (e.g., a gas generator) of the turbine engine 22. The aircraft propulsion system 20 and its turbine engine 22 of FIG. 1 also include a core flowpath 44 (e.g., an annular core flowpath) and a bypass flowpath 46 (e.g., an annular bypass flowpath). The core flowpath 44 extends sequentially through the LPC section 39A, the HPC section 39B, the combustor section 40, the HPT section 41A and the LPT section 41B from an airflow inlet 48 into the core flowpath 44 to a combustion products exhaust 50 out from the core flowpath 44. The bypass flowpath 46 extends through a bypass duct from an airflow inlet 52 into the bypass flowpath 46 to an airflow exhaust 54 from the bypass flowpath 46, where the bypass duct may be formed by the inner housing structure 26 and the outer housing structure 28. The bypass flowpath 46 and its bypass duct are configured to bypass (e.g., are disposed radially outboard of and extend along) the engine core 42 and the inner housing structure 26.

The propulsor section 38, the LPC section 39A, the HPC section 39B, the combustor section 40, the HPT section 41A and the LPT section 41B may be arranged sequentially along the propulsion system axis 32 within the propulsion system housing 24. The propulsor section 38 includes a bladed propulsor rotor 56; e.g., a fan rotor. The LPC section 39A includes a bladed low pressure compressor (LPC) rotor 57. The HPC section 39B includes a bladed high pressure compressor (HPC) rotor 58. The HPT section 41A includes a bladed high pressure turbine (HPT) rotor 59. The LPT section 41B includes a bladed low pressure turbine (LPT) rotor 60. Each of these engine rotors 56-60 includes a rotor base (e.g., a disk or a hub) and a plurality of rotor blades (e.g., airfoils, vanes, etc.). The rotor blades may be arranged into one or more stages axially along the respective engine rotor 56-60. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 58 is coupled to and rotatable with the HPT rotor 59. The HPC rotor 58 of FIG. 1, for example, is connected to the HPT rotor 59 through a high speed shaft 62. At least (or only) the HPC rotor 58, the HPT rotor 59 and the high speed shaft 62 collectively form a high speed rotating structure 64; e.g., a high speed spool of the turbine engine 22 and its engine core 42. This high speed rotating structure 64 of FIG. 1 and its members 58, 59 and 62 are rotatable about the propulsion system axis 32.

The LPC rotor 57 is coupled to and rotatable with the LPT rotor 60. The LPC rotor 57 of FIG. 1, for example, is connected to the LPT rotor 60 through a low speed shaft 66. At least (or only) the LPC rotor 57, the LPT rotor 60 and the low speed shaft 66 collectively form a low speed rotating structure 68; e.g., a low speed spool of the turbine engine 22 and its engine core 42. This low speed rotating structure 68 of FIG. 1 and its members 57, 60 and 66 are rotatable about the propulsion system axis 32.

The low speed rotating structure 68 is coupled to the propulsor rotor 56 through a rotating structure-to-propulsor (RSP) drivetrain 70. The RSP drivetrain 70 may be configured as a geared drivetrain, where a geartrain 72 (e.g., a transmission, a speed change device, an epicyclic geartrain, etc.) is disposed between and operatively couples the propulsor rotor 56 to the low speed rotating structure 68 and its LPT rotor 60. With this arrangement, the propulsor rotor 56 may rotate at a different (e.g., slower) rotational speed than the low speed rotating structure 68 and its LPT rotor 60. Here, the propulsor rotor 56 and the low speed rotating structure 68 may rotate in a common (the same) direction about the propulsion system axis 32 or in opposite directions about the propulsion system axis 32 depending, for example, upon the specific configuration of the geartrain 72. Alternatively, the RSP drivetrain 70 may be configured as a direct-drive drivetrain, where the geartrain 72 is omitted. With such an arrangement, the propulsor rotor 56 rotates at a common (the same) rotational speed as the low speed rotating structure 68 and its LPT rotor 60.

The inner housing structure 26 of FIG. 1 includes an inner case 74 (e.g., a core case) for the turbine engine 22, and an inner nacelle structure 76 (sometimes referred to as an inner fixed structure (IFS)). The inner case 74 is disposed radially outboard of, extends axially along and may circumscribe one or more or all of the engine sections 39A-41B and the engine rotors 57-60. The inner case 74 may thereby house and provide a support structure for the respective engine sections 39A-41B and the engine rotors 57-60. The inner nacelle structure 76 is configured to provide an aerodynamic cover over the engine core 42 and its inner case 74. The inner housing structure 26 and its inner nacelle structure 76 may also form a radial inner peripheral boundary of the bypass flowpath 46.

The outer housing structure 28 of FIG. 1 includes an outer case 78 (e.g., a fan case) for the turbine engine 22 and an outer nacelle structure 80. The outer case 78 is disposed radially outboard of, extends axially along and may circumscribe the propulsor section 38 and its propulsor rotor 56. The outer case 78 may thereby house and may be configured as a containment structure for the propulsor section 38 and its propulsor rotor 56. The outer nacelle structure 80 is configured to provide an aerodynamic cover over the outer case 78. The outer housing structure 28 and its outer nacelle structure 80 may also form a radial outer peripheral boundary of the bypass flowpath 46. Of course, where the aircraft propulsion system 20 is alternatively configured as an open propulsor rotor propulsion system (e.g., the propulsor rotor 56 is an open propulsor rotor), the outer housing structure 28 may be omitted to expose the propulsor rotor 56 to an environment 82 external to the aircraft and its aircraft propulsion system 20.

During operation of the aircraft propulsion system 20 of FIG. 1, ambient air from the external environment 82 enters the aircraft propulsion system 20 and its turbine engine 22 through an airflow inlet 84. This air is propelled by the rotating propulsor rotor 56 in a downstream, aft direction towards the propulsion system aft end 36.

An outer stream of the air propelled by the rotating propulsor rotor 56 is directed into the bypass flowpath 46 through its bypass inlet 52, which air entering the bypass flowpath 46 may be referred to as "bypass air". The guide vane structure 30 conditions (e.g., straightens out, de-swirls, etc.) the flow of the bypass air within the bypass duct. This conditioned bypass air is subsequently directed out of the aircraft propulsion system 20 through the bypass exhaust 54 to provide forward thrust. This propulsion of the bypass air may account for a majority of the forward thrust generated by the aircraft propulsion system 20 and its turbine engine 22 of FIG. 1.

An inner stream of the air propelled by the rotating propulsor rotor 56 is directed into the core flowpath 44 through its core inlet 48, which air entering the core flowpath 44 may be referred to as "core air". This core air is compressed by the LPC rotor 57 and the HPC rotor 58 and is directed into a combustion chamber 86 (e.g., annular combustion chamber) of a combustor 88 (e.g., annular combustor) in the combustor section 40. Fuel is injected into the combustion chamber 86 by one or more fuel injectors 90 and mixed with the compressed core air to provide a fuel-air mixture. This fuel-air mixture is ignited and combustion products thereof flow through and sequentially drive rotation of the HPT rotor 59 and the LPT rotor 60. The rotation of the HPT rotor 59 and the LPT rotor 60 respectively drive rotation of the HPC rotor 58 and the LPC rotor 57 and, thus, compression of the air received from the core inlet 48. The rotation of the LPT rotor 60 also drives rotation of the propulsor rotor 56 through the RSP drivetrain 70.

While the turbine engine 22 is described above with a particular two rotating structure arrangement (e.g., a two-spool architecture), the present disclosure is not limited thereto. For example, the LPC rotor 57 may be omitted to configure the LPT rotor 60 as a power turbine (PT) rotor for the propulsor rotor 56. The turbine engine 22 may also or alternatively include another rotating structure with a bladed compressor rotor in the compressor section 39 and a bladed turbine rotor in the turbine section 41; e.g., an intermediate speed spool for the engine core 42.

Figure 2:
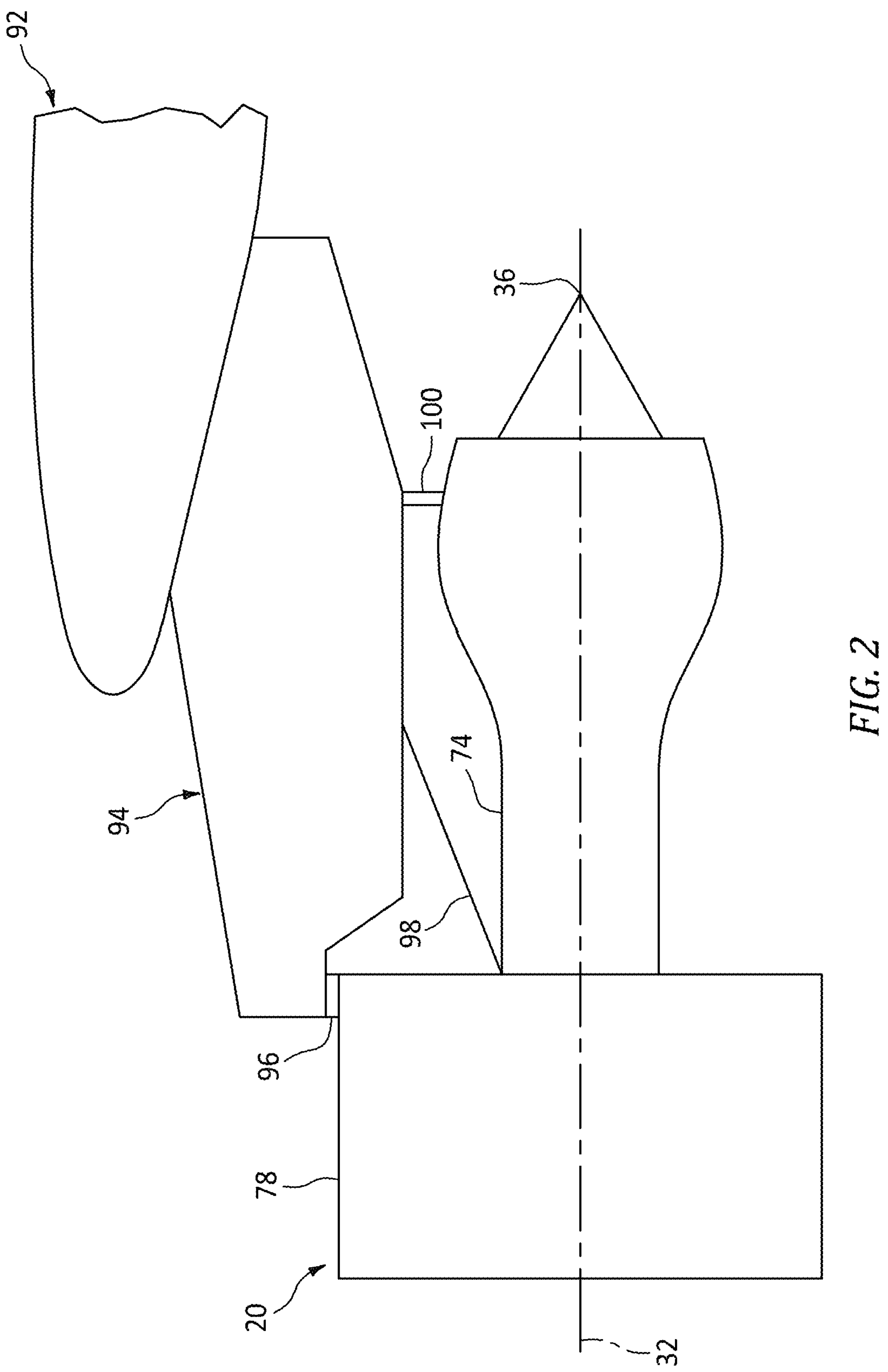
FIG. 2 is a side schematic illustration of a gas turbine engine of the aircraft propulsion system mounted to an aircraft airframe through a pylon structure with a fan mounted attachment arrangement.
Figure 3:
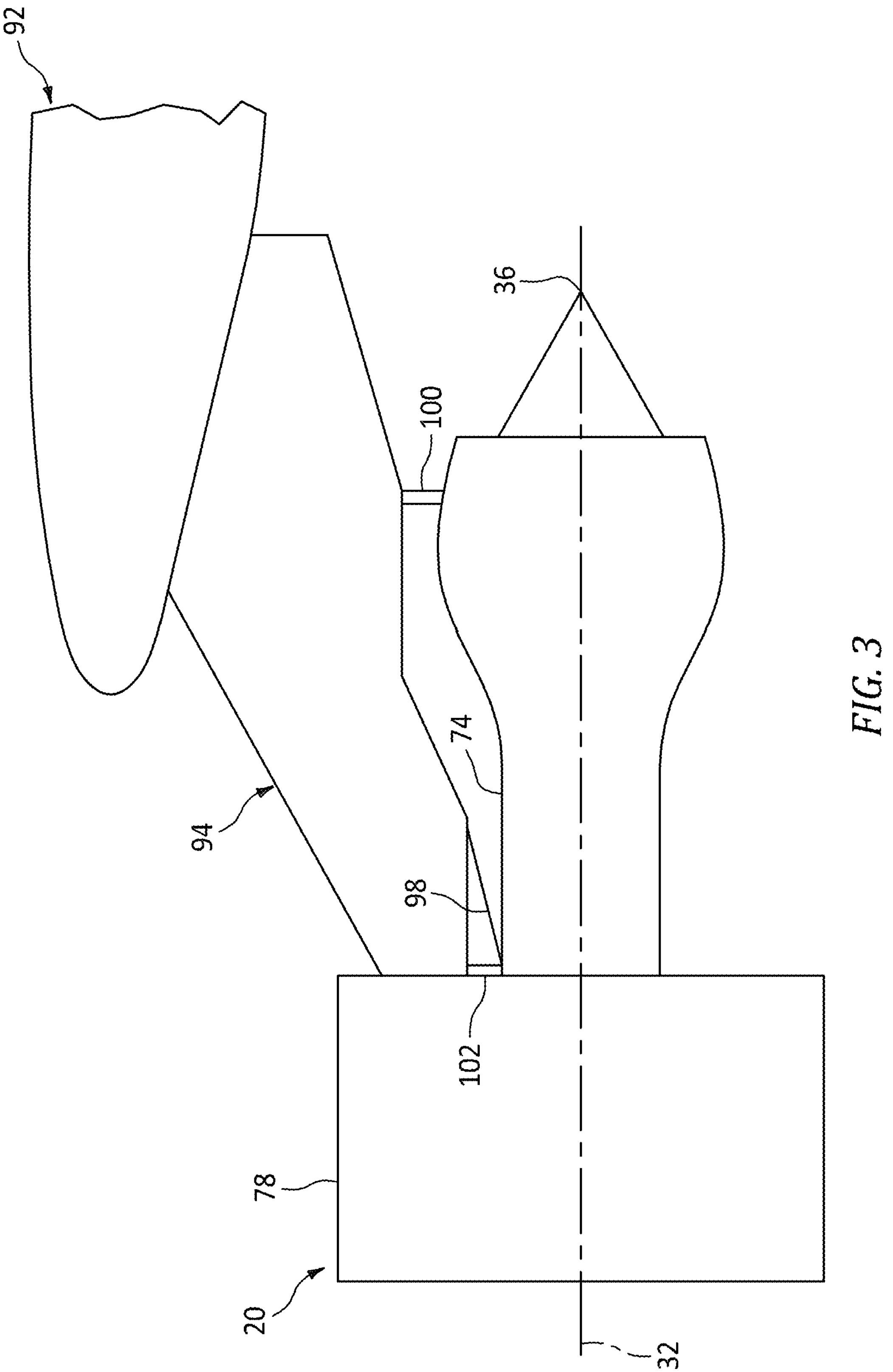
FIG. 3 is a side schematic illustration of the gas turbine engine mounted to the aircraft airframe through the pylon structure with a core mounted attachment arrangement.

Referring to FIG. 2, the aircraft propulsion system 20 and its turbine engine 22 are mounted to an airframe 92 of the aircraft by a pylon structure 94 through a fan mounted attachment arrangement. This pylon structure 94 is mounted to the aircraft propulsion system 20 and its turbine engine 22 by one or more propulsion system-pylon attachments. For example, the pylon structure 94 of FIG. 2 is mounted to the outer case 78 by an outer case attachment 96. The pylon structure 94 is mounted to the inner case 74 by one or more forward inner case attachments 98 (one visible in FIG. 2). The forward inner case attachment(s) 98 may be axial forwardmost attachment(s) mounting the inner case 74 to the pylon structure 94. The pylon structure 94 is also attached to the inner case 74 at an aft inner case attachment 100. This aft inner case attachment 100 may be an axial aftmost attachment mounting the inner case 74 and, more generally, the aircraft propulsion system 20 and its turbine engine 22 to the pylon structure 94. The present disclosure, however, is not limited to such an exemplary aircraft propulsion system-pylon attachment arrangement. For example, the outer case attachment 96 between the pylon structure 94 and the outer case 78 may be omitted as shown in FIG. 3. With such a core mounted attachment arrangement, an additional attachment 102 may be included at (e.g., on, adjacent or proximate) a support structure coupling the inner case 74 to the outer case 78. Here, the additional attachment 102 may functionally replace the omitted outer case attachment such that structural couplings between (a) the aircraft propulsion system 20 and its turbine engine 22 and (b) the pylon structure 94 are independent of the outer case 78. Similarly, in another example, the functionality of the omitted outer case attachment may be integrated into a single attachment structure with the forward inner case attachment(s) 98.

Figure 4:
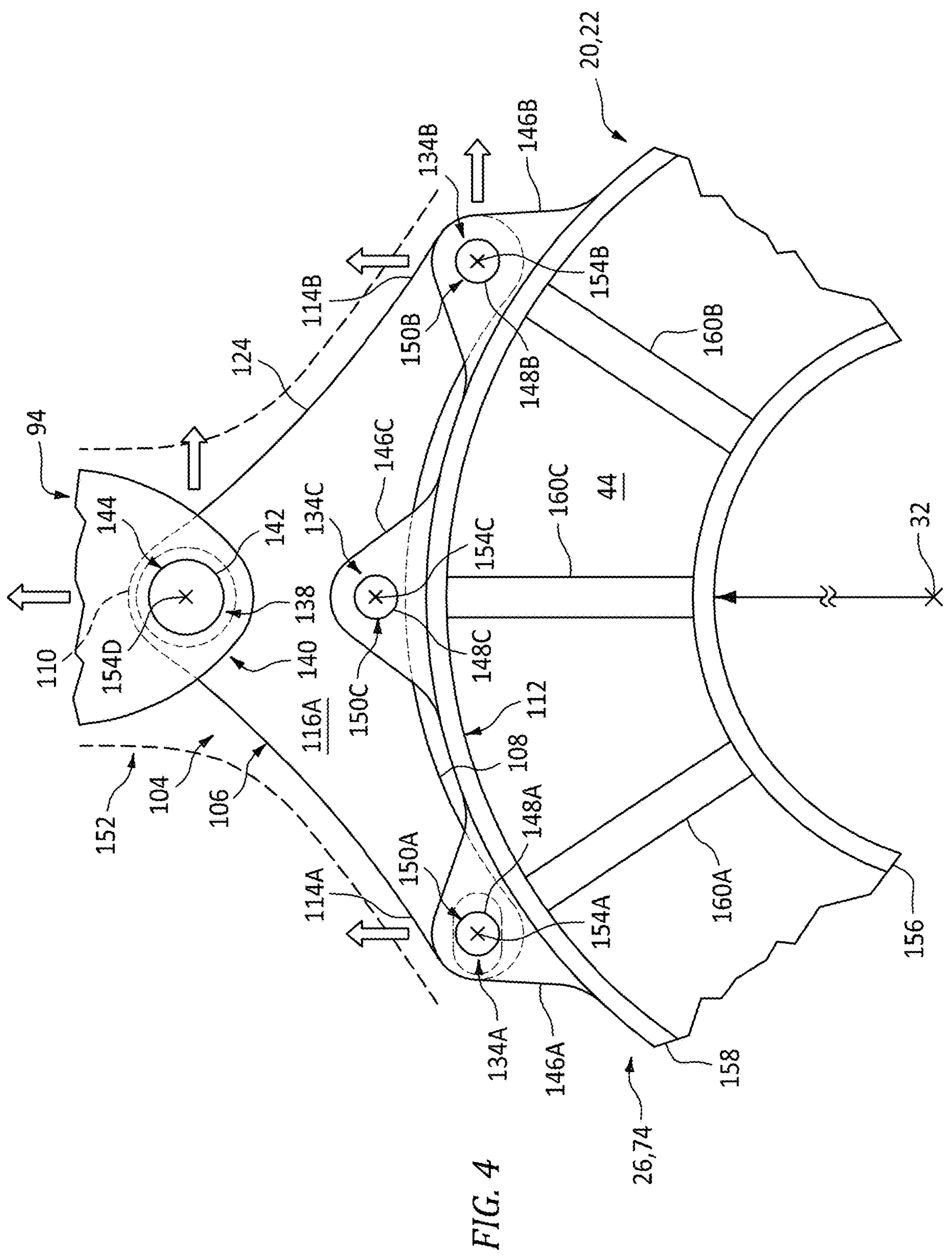
FIG. 4 is a partial end view illustration of a propulsion system-pylon attachment mounting a turbine engine case to the pylon structure.

FIG. 4 illustrates an aft propulsion system-pylon attachment 104 for mounting and structurally tying the aircraft propulsion system 20 and its turbine engine 22 to the pylon structure 94. This aft propulsion system-pylon attachment 104 may be configured as an aftmost structural coupling between (a) the aircraft propulsion system 20 and its turbine engine 22 and (b) the pylon structure 94. The aft propulsion system-pylon attachment 104 of FIG. 4, for example, may be configured as the aft inner case attachment 100 of FIG. 2 or FIG. 3. The aft propulsion system-pylon attachment 104 of the present disclosure, however, is not limited to such exemplary aircraft propulsion system-pylon attachment arrangements. The aft propulsion system-pylon attachment 104 of FIG. 4 includes an attachment bracket 106; e.g., a yoke plate.

Figure 5:
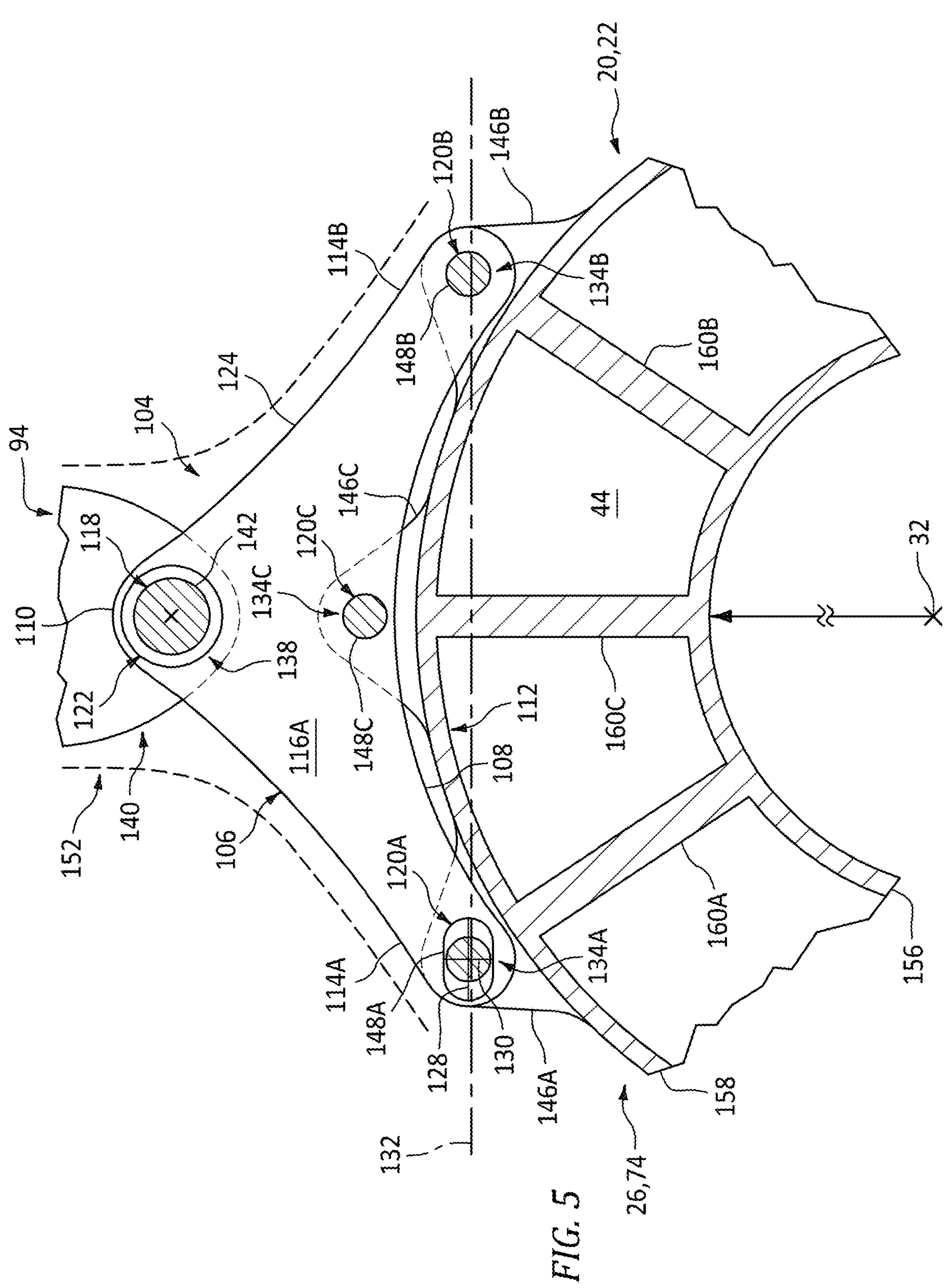
FIG. 5 is a partial cross-sectional illustration of the propulsion system-pylon attachment mounting the turbine engine case to the pylon structure.
Figure 6:
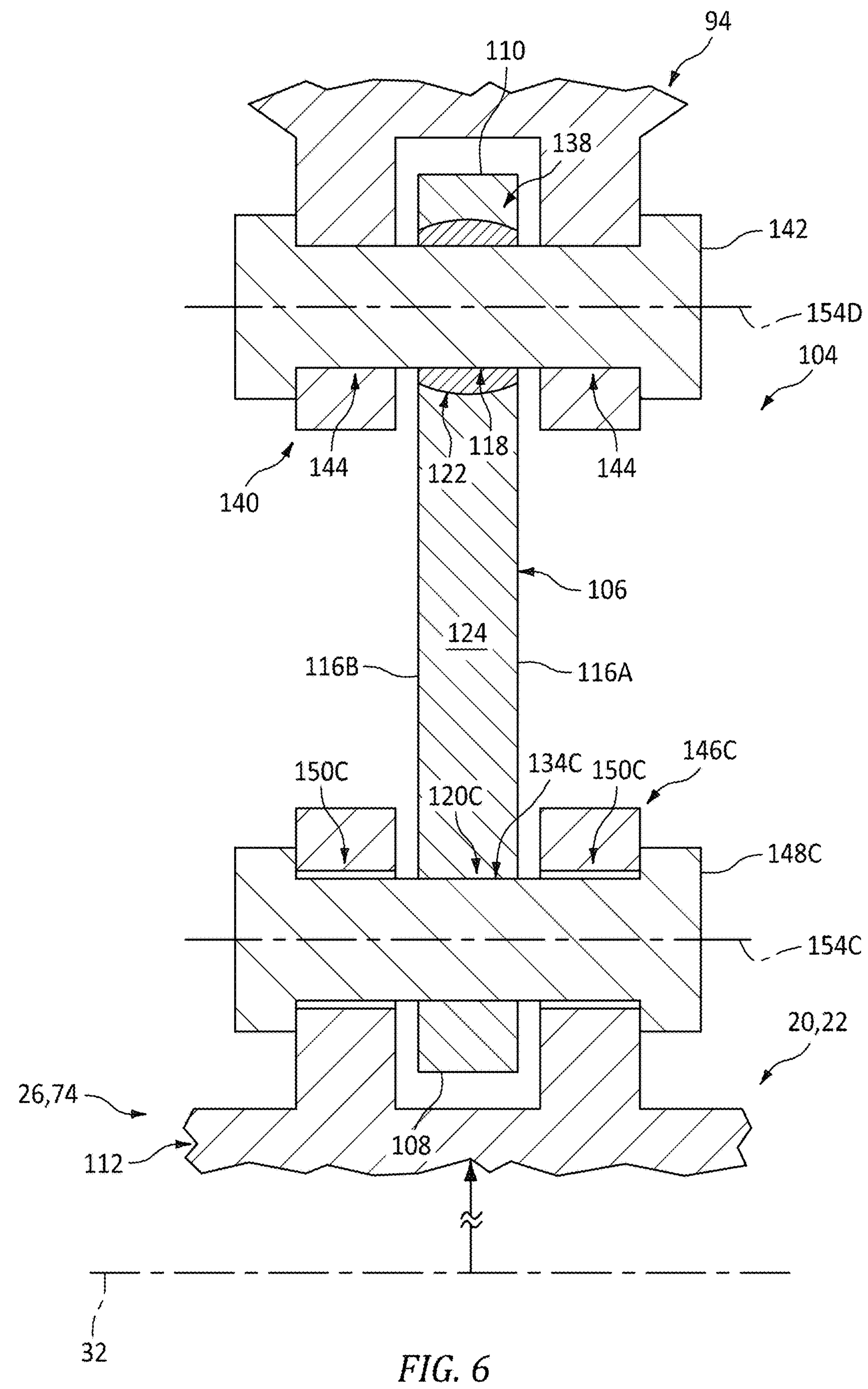
FIG. 6 is a partial cutaway illustration through an intermediate portion of the propulsion system-pylon attachment mounting the turbine engine case to the pylon structure.

Referring to FIG. 5, the attachment bracket 106 extends radially from a radial inner side 108 of the attachment bracket 106 to a radial outer side 110 of the attachment bracket 106. Briefly, the bracket inner side 108 may have a concave cross-sectional geometry when viewed in a reference plane, for example, perpendicular to the propulsion system axis 32. With this cross-sectional geometry, the attachment bracket 106 and its bracket inner side 108 may extend circumferentially about and/or substantially conform to a radial outer periphery of a tubular sidewall 112 of the inner case 74. The attachment bracket 106 extends laterally between and to opposing lateral sides 114A and 114B (generally referred to as "114") of the attachment bracket 106. Herein, the term "lateral" may describe a circumferential direction about the propulsion system axis 32 and/or a tangential direction to a reference circle circumscribing the propulsion system axis 32. Referring to FIG. 6, the attachment bracket 106 extends axially along the propulsion system axis 32 between and to opposing axial sides 116A and 116B (generally referred to as "116") of the attachment bracket 106. Referring again to FIG. 5, the attachment bracket 106 includes an outer pylon-bracket connection aperture 118 and a plurality of inner mount-bracket connection apertures 120A-C (generally referred to as "120").

The pylon-bracket connection aperture 118 is located at an intermediate location (e.g., a lateral center) laterally between the opposing lateral sides 114 of the attachment bracket 106. The pylon-bracket connection aperture 118 is disposed at or otherwise towards the bracket outer side 110. The pylon-bracket connection aperture 118 projects axially through the attachment bracket 106. This pylon-bracket connection aperture 118 may be formed by a pylon-bracket connection bearing 122 (e.g., a spherical bearing) mounted to a body 124 of the attachment bracket 106. Alternatively, the pylon-bracket connection aperture 118 may be formed by material forming the body 124 of the attachment bracket 106. The pylon-bracket connection aperture 118 of FIG. 5 has a circular cross-sectional geometry when viewed in the reference plane.

Figure 7:
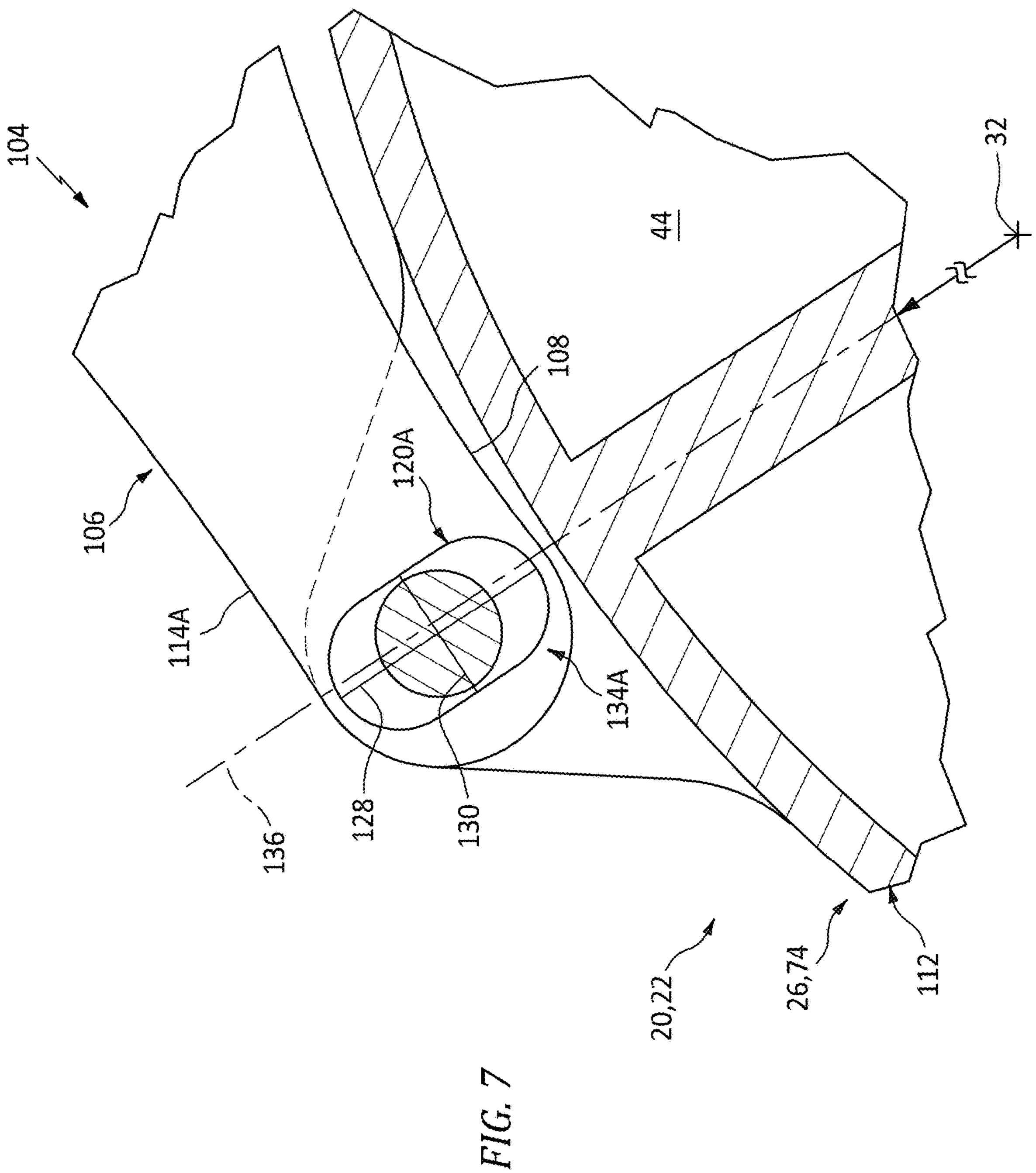
FIG. 7 is a partial end view illustration of the propulsion system-pylon attachment with another arrangement mounting the turbine engine case to the pylon structure.

The first mount-bracket connection aperture 120A is located at a corner (e.g., a tapering intersection) between the bracket first lateral side 114A and the bracket inner side 108. The first mount-bracket connection aperture 120A projects axially through the attachment bracket 106. The first mount-bracket connection aperture 120A may be formed by the material forming the body 124 of the attachment bracket 106. The first mount-bracket connection aperture 120A may have an elongated (e.g., ovalized) cross-sectional geometry when viewed in the reference plane. The cross-sectional geometry of the first mount-bracket connection aperture 120A of FIG. 5, for example, includes a major axis 128 and a minor axis 130, where a dimension of the major axis 128 is longer than a dimension of the minor axis 130, and where the major axis 128 may be perpendicular to the minor axis 130. The major axis 128 may be horizontal when, for example, the aircraft is flying in level flight and/or on ground. The major axis 128 of FIG. 5, more particularly, may be within ten degrees (±10°) or five degrees (±5°) of parallel with (e.g., exactly parallel with) a straight horizonal reference line 132 when viewed in the reference plane. This horizonal reference line 132 may be coincident with and extend through a center of a first mount-bracket pin connection 134A and a center of a second mount-bracket pin connection 134B. The present disclosure, however, is not limited to such an exemplary arrangement. For example, referring to FIG. 7, the major axis 128 may alternatively be within ten degrees (±10°) or five degrees (±5°) of parallel with (e.g., exactly parallel with) a straight radial reference line 136 when viewed in the reference plane. This radial reference line 136 may be a ray projecting radially out from the propulsion system axis 32 and may be coincident with and extend through the center of the first mount-bracket pin connection 134A.

Referring to FIG. 5, the second mount-bracket connection aperture 120B is located at a corner (e.g., a tapering intersection) between the bracket second lateral side 114B and the bracket inner side 108. The second mount-bracket connection aperture 120B projects axially through the attachment bracket 106. The second mount-bracket connection aperture 120B may be formed by the material forming the body 124 of the attachment bracket 106. The second mount-bracket connection aperture 120B may have a circular cross-sectional geometry when viewed in the reference plane. A diameter of this second mount-bracket connection aperture 120B may be equal to the minor axis dimension of the first mount-bracket connection aperture 120A.

The intermediate mount-bracket connection aperture 120C is located at an intermediate location (e.g., a lateral center) laterally between the opposing lateral sides 114 of the attachment bracket 106. This intermediate mount-bracket connection aperture 120C is located laterally (e.g., centered) between the first mount-bracket connection aperture 120A and the second mount-bracket connection aperture 120B. The intermediate mount-bracket connection aperture 120C may also be laterally aligned with the pylon-bracket connection aperture 118. The intermediate mount-bracket connection aperture 120C is disposed at or otherwise towards the bracket inner side 108. The intermediate mount-bracket connection aperture 120C projects axially through the attachment bracket 106. The intermediate mount-bracket connection aperture 120C may be formed by the material forming the body 124 of the attachment bracket 106. The intermediate mount-bracket connection aperture 120C may have a circular cross-sectional geometry when viewed in the reference plane. A diameter of this intermediate mount-bracket connection aperture 120C may (or may not) be equal to the minor axis dimension of the first mount-bracket connection aperture 120A and/or the diameter of the second mount-bracket connection aperture 120B.

The body 124 of the attachment bracket 106 may be configured as a monolithic body. The body 124 of the attachment bracket 106, for example, may be cast, machined, forged, additively manufactured and/or otherwise formed together as a single, unitary body. The present disclosure, however, is not limited to such an exemplary attachment bracket construction. For example, the attachment bracket 106 may alternatively be a multi-segment body. The attachment bracket 106, more particularly, may alternatively be formed by two axially side-by-side plates.

Referring to FIG. 6, the attachment bracket 106 is mounted to the pylon structure 94 through a pylon-bracket pin connection 138. The attachment bracket 106 of FIG. 6, for example, is received within a channel of a pylon mount 140 (e.g., a clevis mount) of the pylon structure 94. Briefly, this pylon mount 140 is fixedly connected to a base (e.g., a beam, a frame, a truss, etc.) of the pylon structure 94. The pylon-bracket pin connection 138 of FIG. 6 includes the pylon-bracket connection bearing 122 and a pylon-bracket connection pin 142. The pylon-bracket connection pin 142 is mated with the pylon-bracket connection aperture 118 and a pin connection aperture 144 in the pylon mount 140. More particularly, the pylon-bracket connection pin 142 projects sequentially through (a) a first portion of the pin connection aperture 144 in a first flange of the pylon mount 140, (b) the pylon-bracket connection aperture 118, and (c) a second portion of the pin connection aperture 144 in a second flange of the pylon mount 140. The pylon-bracket connection pin 142 may be configured as a bolt, a clevis pin or any other type of suitable pin fastener. Here, a diameter of the pylon-bracket connection pin 142 may be substantially equal to diameters of the pin connection aperture 144 and the pylon-bracket connection aperture 118.

Referring to FIGS. 4 and 5, the pylon-bracket pin connection 138 may be a sole (the only) coupling between the attachment bracket 106 and the pylon structure 94. The attachment bracket 106 and, more generally, the entire aft propulsion system-pylon attachment 104 may thereby be operable to pivot about the pylon-bracket pin connection 138 and move relative to the pylon structure 94; e.g., in the reference plane.

Figure 8:
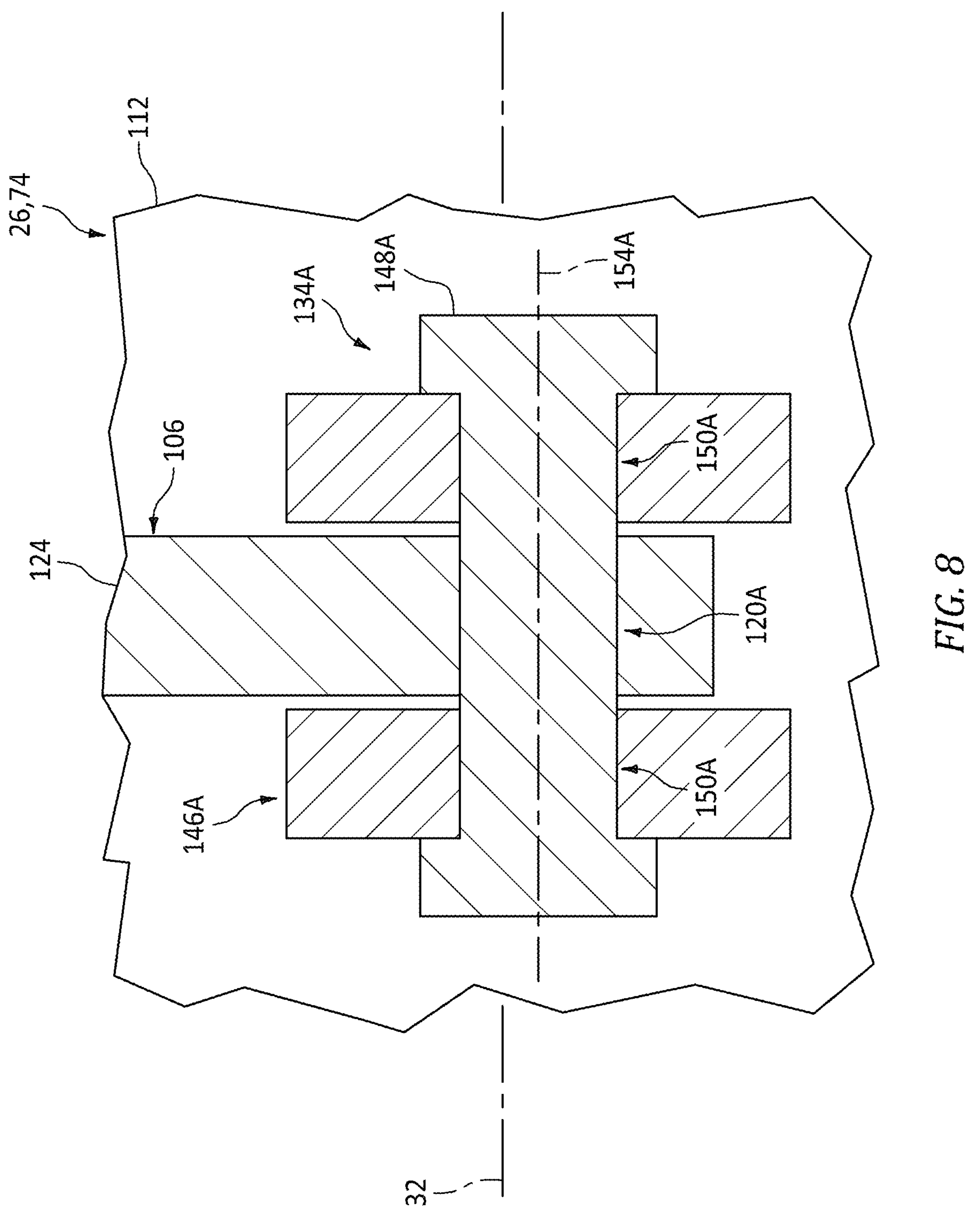
FIG. 8 is a partial cutaway illustration through a first side portion of the propulsion system-pylon attachment mounting the turbine engine case to the pylon structure.

Referring to FIG. 8, the attachment bracket 106 is mounted to the inner case 74 through the first mount-bracket pin connection 134A. The attachment bracket 106 of FIG. 8, for example, is received within a channel of a first case mount 146A (e.g., a clevis mount) of the inner case 74. Briefly, this first case mount 146A is disposed radially outboard of and is fixedly connected to the sidewall 112 of the inner case 74 (see also FIG. 4). The first mount-bracket pin connection 134A of FIG. 8 includes a first mount-bracket connection pin 148A. The first mount-bracket connection pin 148A is mated with the first mount-bracket connection aperture 120A and a pin connection aperture 150A (another mount-bracket connection aperture) in the first case mount 146A. More particularly, the first mount-bracket connection pin 148A projects sequentially through (a) a first portion of the pin connection aperture 150A in a first flange of the first case mount 146A, (b) the first mount-bracket connection aperture 120A and (c) a second portion of the pin connection aperture 150A in a second flange of the first case mount 146A. The first mount-bracket connection pin 148A may be configured as a bolt, a clevis pin or any other type of suitable pin fastener. Here, a diameter of the first mount-bracket connection pin 148A may be substantially equal to a diameter of the pin connection aperture 150A and the minor axis dimension of the first mount-bracket connection aperture 120A. With this arrangement, the first mount-bracket connection pin 148A may shift along the major axis 128 of FIG. 5 of the first mount-bracket connection aperture 120A to facilitate, for example, thermal deformation of the inner case 74 and its sidewall 112 during aircraft propulsion system operation.

Figure 9:
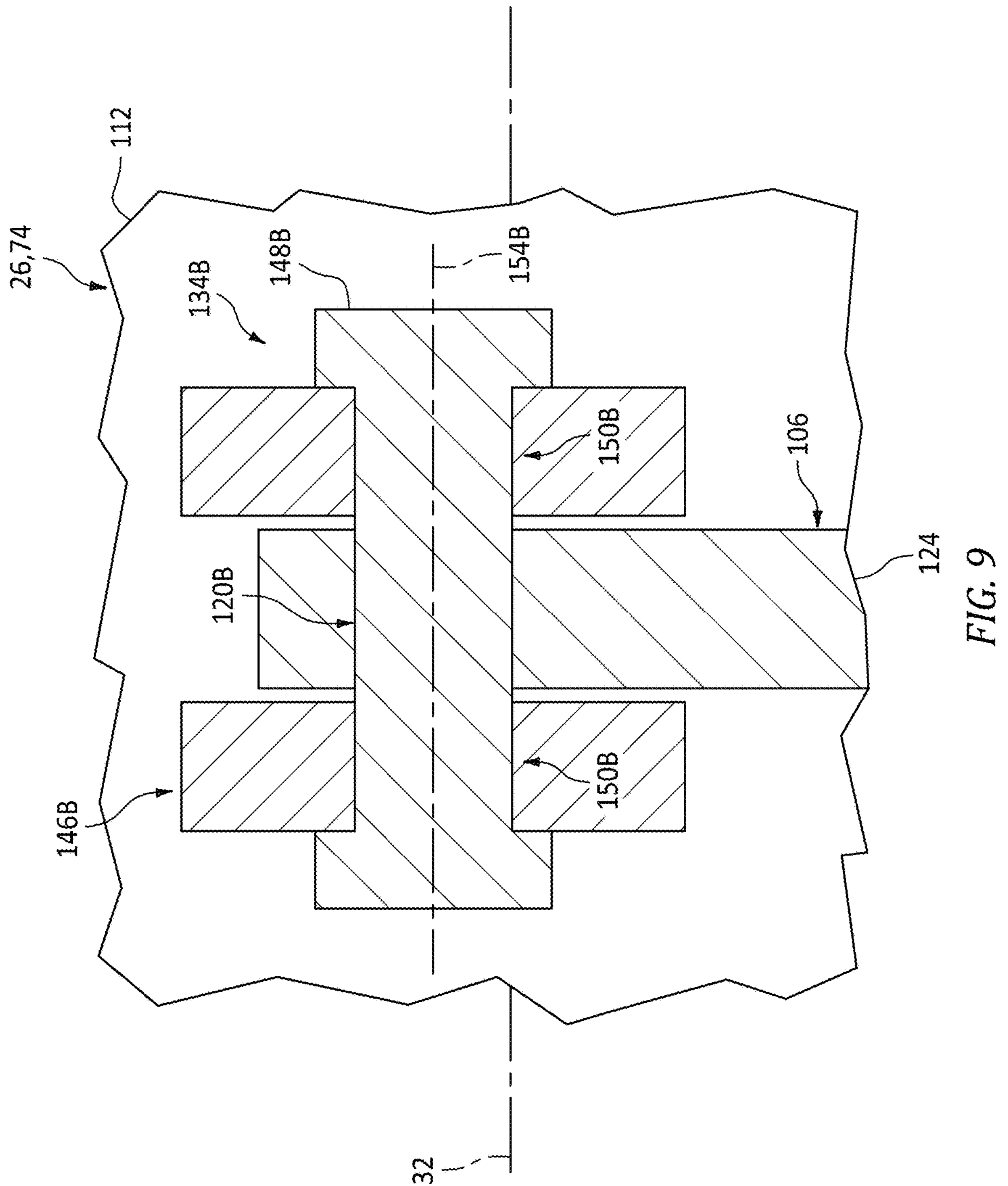
FIG. 9 is a partial cutaway illustration through a second side portion of the propulsion system-pylon attachment mounting the turbine engine case to the pylon structure.

Referring to FIG. 9, the attachment bracket 106 is mounted to the inner case 74 through the second mount-bracket pin connection 134B. The attachment bracket 106 of FIG. 9, for example, is received within a channel of a second case mount 146B (e.g., a clevis mount) of the inner case 74. Briefly, this second case mount 146B is disposed radially outboard of and is fixedly connected to the sidewall 112 of the inner case 74 (see also FIG. 4). Referring to FIGS. 4 and 5, the second case mount 146B is further circumferentially offset from the first case mount 146A about the sidewall 112 of the inner case 74 and the propulsion system axis 32. The second mount-bracket pin connection 134B of FIG. 9 includes a second mount-bracket connection pin 148B. The second mount-bracket connection pin 148B is mated with the second mount-bracket connection aperture 120B and a pin connection aperture 150B (another mount-bracket connection aperture) in the second case mount 146B. More particularly, the second mount-bracket connection pin 148B projects sequentially through (a) a first portion of the pin connection aperture 150B in a first flange of the second case mount 146B, (b) the second mount-bracket connection aperture 120B and (c) a second portion of the pin connection aperture 150B in a second flange of the second case mount 146B. The second mount-bracket connection pin 148B may be configured as a bolt, a clevis pin or any other type of suitable pin fastener. Here, a diameter of the second mount-bracket connection pin 148B may be substantially equal to diameters of the pin connection aperture 150B and the second mount-bracket connection aperture 120B.

Referring to FIG. 6, the attachment bracket 106 is mounted to the inner case 74 through an intermediate mount-bracket pin connection 134C. The attachment bracket 106 of FIG. 6, for example, is received within a channel of an intermediate case mount 146C (e.g., a clevis mount) of the inner case 74. Briefly, this intermediate case mount 146C is disposed radially outboard of and is fixedly connected to the sidewall 112 of the inner case 74. Referring to FIGS. 4 and 5, the intermediate case mount 146C is further circumferentially offset from and arranged circumferentially between the first case mount 146A and the second case mount 146B about the sidewall 112 of the inner case 74 and the propulsion system axis 32. The intermediate mount-bracket pin connection 134C of FIG. 6 includes an intermediate mount-bracket connection pin 148C. The intermediate mount-bracket connection pin 148C is mated with the intermediate mount-bracket connection aperture 120C and a pin connection aperture 150C (another mount-bracket connection aperture) in the intermediate case mount 146C. More particularly, the intermediate mount-bracket connection pin 148C projects sequentially through (a) a first portion of the pin connection aperture 150C in a first flange of the intermediate case mount 146C, (b) the intermediate mount-bracket connection aperture 120C and (c) a second portion of the pin connection aperture 150C in a second flange of the intermediate case mount 146C. The intermediate mount-bracket connection pin 148C may be configured as a bolt, a clevis pin or any other type of suitable pin fastener.

A diameter of the intermediate mount-bracket connection pin 148C may be substantially equal to the diameter of the intermediate mount-bracket connection aperture 120C. By contrast, the diameter of the intermediate mount-bracket connection pin 148C may be less than a diameter of the pin connection aperture 150C. The diameter of the pin connection aperture 150C, for example, may be equal to or greater than 1.05 times (1.05×), 1.10 times (1.1×) or 1.2 times (1.2×) the diameter of the intermediate mount-bracket connection pin 148C. The pin connection aperture 150C may thereby be configured as an oversized hole for the intermediate mount-bracket connection pin 148C. With this configuration, the intermediate mount-bracket connection pin 148C may shift vertically and/or horizontally within the pin connection aperture 150C while the first mount-bracket pin connection 134A and the second mount-bracket pin connection 134B (see FIGS. 4 and 5) remain intact. However, in an unlikely event the first mount-bracket pin connection 134A and/or the second mount-bracket pin connection 134B (see FIGS. 4 and 5) fails, the intermediate mount-bracket pin connection 134C provides a waiting fail-safe (WFS); e.g., a fail-safe pin connection. More particularly, in the unlikely event the first mount-bracket pin connection 134A and/or the second mount-bracket pin connection 134B (see FIGS. 4 and 5) fails, the intermediate mount-bracket connection pin 148C may contact the flanges of the intermediate case mount 146C and functionally replace the failed mount-bracket pin connection(s) 134A and/or 134B (see FIGS. 4 and 5). The intermediate mount-bracket pin connection 134C may thereby maintain a mechanical coupling between the inner case 74 and the attachment bracket 106.

Referring to FIGS. 4 and 5, the aft propulsion system-pylon attachment 104 is configured to transfer one or more loads between the aircraft propulsion system 20 and its turbine engine 22 and the pylon structure 94 (e.g., see exemplary lateral and vertical load vector arrows shown in FIG. 4). More particularly, the aft propulsion system-pylon attachment 104 is configured to transfer one or more loads between the inner case 74 and the pylon structure 94. These loads may include a vertical load (e.g., a radial up-or-down load inline with the propulsion system axis 32 and the pylon structure 94) and/or a lateral load (e.g., a horizontal side-to-side load). However, the attachment bracket 106 is arranged such that a torsional load may not be reacted by and transferred into the aft propulsion system-pylon attachment 104 from the turbine engine 22 and its inner case 74. Rather, such a torsional load may be reacted by and transferred through one of the other attachments 96, 102 of FIG. 2 or FIG. 3, for example. An overall form factor of the aft propulsion system-pylon attachment 104 of FIGS. 4 and 5 may thereby be reduced facilitating a reduction in an overall size and exterior aero-lines of a pylon nacelle 152 housing the pylon structure 94 at an aft of the aircraft propulsion system 20. For example, side panels of the pylon nacelle 152 may substantially hug a lateral side of the pylon structure 94 and an outer side of the inner case 74 with a relatively small radius bend there in-between. By reducing the pylon nacelle size, aerodynamic drag and/or a total weight of the pylon nacelle 152 may be reduced thereby facilitating improved aircraft propulsion system efficiency.

Each of the pin connections 134A-C (generally referred to as "134"), 138 has a centerline axis 154A-D (generally referred to as "154"); e.g., a central pivot axis. Each of these pin connection axes 154 may be within ten degrees (±10°) or five degrees (±5°) of parallel (e.g., exactly parallel) with one another. One or more or all of the pin connection axes 154 may also (or alternatively) be within ten degrees (±10°) or five degrees (±5°) of parallel (e.g., exactly parallel) with the propulsion system axis 32, or at least a centerline axis of the inner case 74. With such an arrangement and as shown in FIGS. 4 and 5, the attachment bracket 106 may lay in the reference plane (e.g., the plane of FIG. 4 or 5) and may be perpendicular to the propulsion system axis 32, or at least the centerline axis of the inner case 74.

The inner housing structure 26 of FIGS. 4 and 5 includes a stator vane structure. This stator vane structure is arranged along the core flowpath 44, for example downstream of the combustor section 40 of FIG. 1. More particularly, the stator vane structure may be arranged along the core flowpath 44 downstream of the turbine section 41 of FIG. 1 The stator vane structure of FIGS. 4 and 5, for example, may be configured as a turbine exhaust case (TEC). The stator vane structure includes a radial inner platform 156, a radial outer platform 158 and a plurality of stator vanes (e.g., 160A-C; generally referred to as "160"); e.g., structural vanes, struts, etc. A radial outer side of the inner platform 156 forms a radial inner peripheral boundary of the core flowpath 44 longitudinally through the stator vane structure. A radial inner side of the outer platform 158 forms a radial outer peripheral boundary of the core flowpath 44 longitudinally through the stator vane structure. This outer platform 158 may be formed by the sidewall 112 of the inner case 74. The stator vanes 160 are arranged and may (or may not) be equispaced circumferentially around the propulsion system axis 32 in an annular array; e.g., a circular array. Each of the stator vanes 160 projects radially across the core flowpath 44 from the inner platform 156 to the outer platform 158. Each of the stator vanes 160 is also connected to (e.g., formed integral with or otherwise attached to) the inner platform 156 and the outer platform 158. Each of the stator vanes 160 may be configured to structurally tie the inner platform 156 to the outer platform 158 across the core flowpath 44.

The first mount-bracket pin connection 134A, the second mount-bracket pin connection 134B and the intermediate mount-bracket pin connection 134C may each be circumferentially and axially aligned with a respective one of the stator vanes 160A-C about the propulsion system axis 32. With this arrangement, loads may be transferred from the respective stator vanes 160A-C, through the outer platform 158/the sidewall 112 of the inner case 74, into the aft propulsion system-pylon attachment 104 along relatively direct (e.g., straight) load paths.

Figure 10:
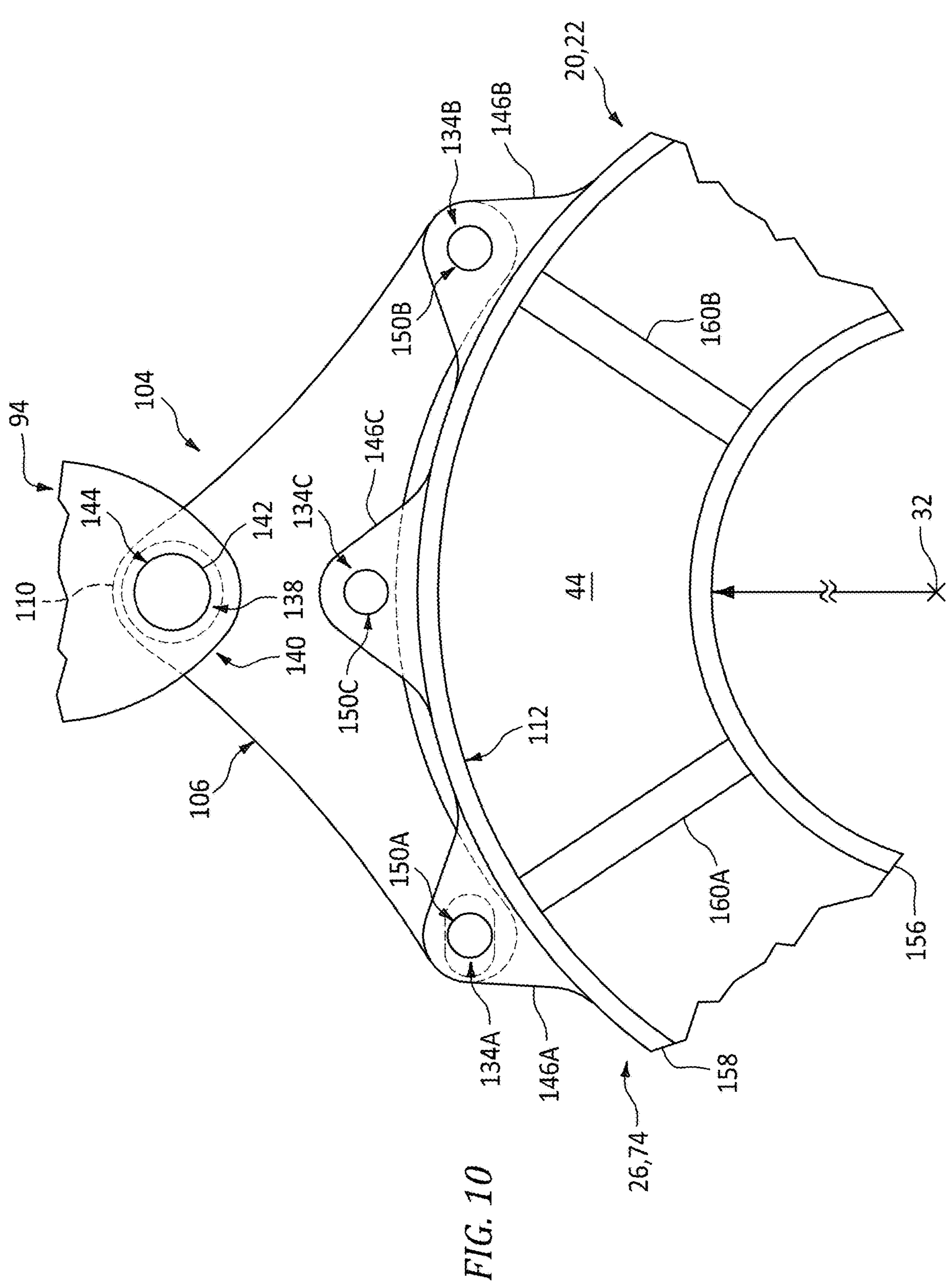
FIG. 10 is a partial end view illustration of the propulsion system-pylon attachment with another arrangement mounting the turbine engine case to the pylon structure.
Figures 11A, 11B, 11C, 11D, 11E, 11F, 11G:
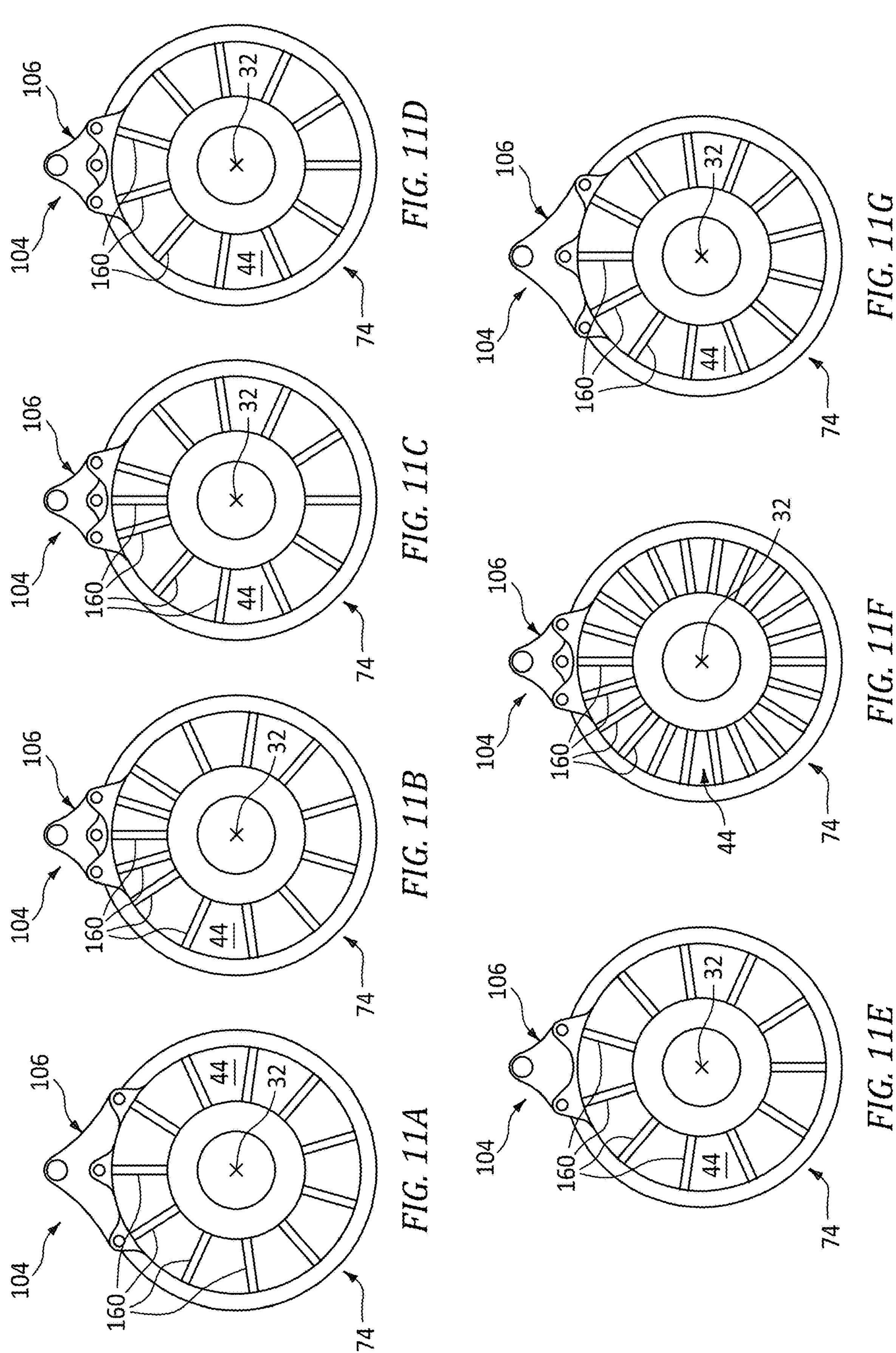
FIGS. 11A-G are partial end view illustrations of the propulsion system-pylon attachment mounted to the turbine engine case configured with various vane structure arrangements.

The stator vane 160C of FIGS. 4 and 5 aligned with the intermediate mount-bracket pin connection 134C is disposed circumferentially between and is next to (a) the stator vane 160A aligned with the first mount-bracket pin connection 134A and (b) the stator vane 160B aligned with the second mount-bracket pin connection 134B. The present disclosure, however, is not limited to such an exemplary arrangement. For example, referring to FIG. 10, the stator vane 160C may be omitted such that the stator vane 160A aligned with the first mount-bracket pin connection 134A is circumferentially next to the stator vane 160B aligned with the second mount-bracket pin connection 134B. In another example, it is contemplated an intervening stator vane may be disposed circumferentially between each set of pin connection aligned stator vanes 160A and 160C, 160B and 160C.

Referring to FIGS. 11A-G, the stator vane structure may be configured with various arrangements of its stator vanes 160. In some embodiments, referring to FIGS. 11A and 11D-G, the stator vanes 160 may be arranged in a uniform pattern circumferentially about the propulsion system axis 32. Here, the stator vanes 160 are equispaced circumferentially about the propulsion system axis 32. Such a uniform pattern may facilitate a substantially uniform flow of combustion products across the stator vane structure through the core flowpath 44. In other embodiments, referring to FIGS. 11B and 11C, the stator vanes 160 may alternatively be arranged in a non-uniform pattern circumferentially about the propulsion system axis 32. Here, the stator vanes 160 are unevenly spaced circumferentially about the propulsion system axis 32, with a higher density of the stator vanes 160 at the aft propulsion system-pylon attachment 104. Such a non-uniform pattern may facilitate a further reduction in the overall size and exterior aero-lines of the pylon nacelle 152 (see FIGS. 4 and 5) housing the pylon structure 94 at an aft of the aircraft propulsion system 20.

Figure 12B:
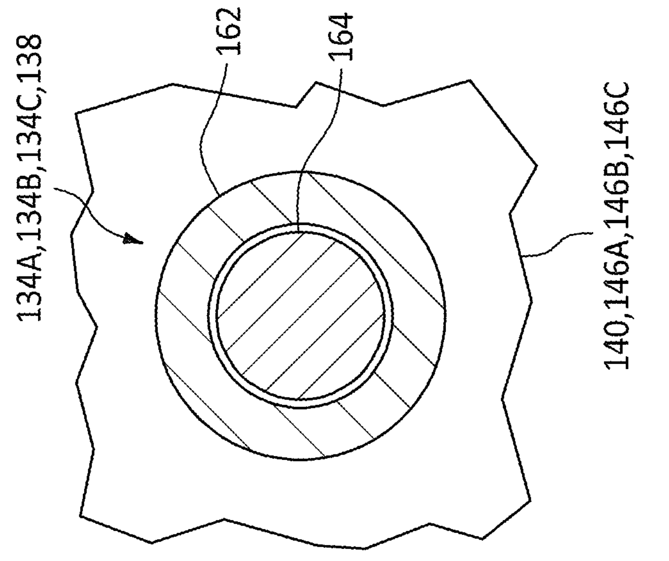
FIGS. 12A and 12B are partial sectional illustrations through a pin connection with various pin arrangements.
Figure 12A:
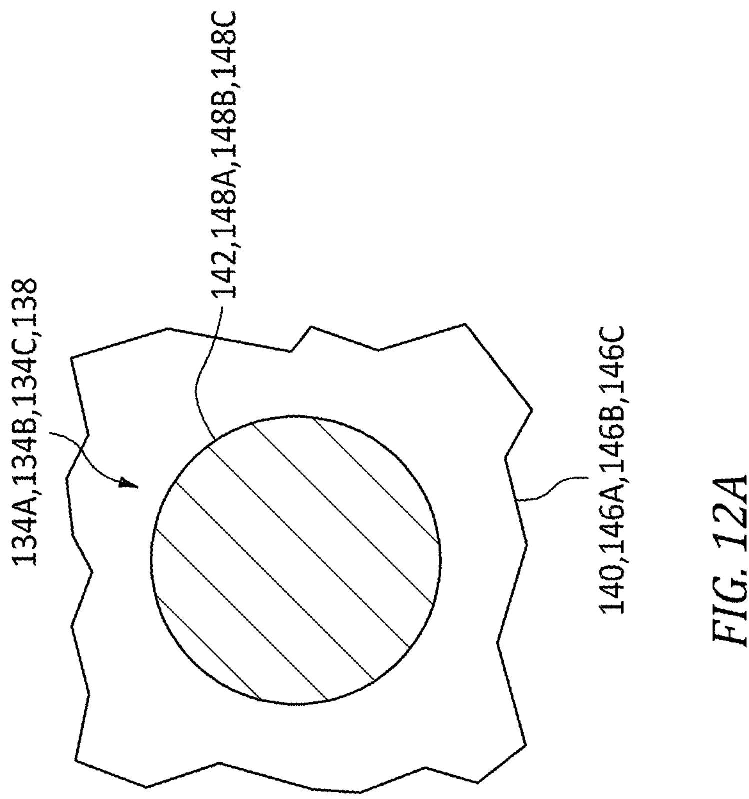

For ease of description, each of the pin connections 134A, 134B, 134C, 138 is described above with its single connection pin 142, 148A, 148B, 148C. Here, each connection pin 142, 148A, 148B, 148C may have a solid cross-sectional geometry in the reference plane as shown, for example, in FIG. 12A. The present disclosure, however, is not limited to such an exemplary connection pin configuration. For example, referring to FIG. 12B, any one or more of the pin connections 134A, 134B, 134C, 138 may alternatively be configured with a coaxial set of pins 162 and 164. With such an arrangement, the outer pin 162 engages (e.g., contacts) the respective mounts 140, 146A, 146B, 146C, and the inner pin 164 projects axially through a bore of the outer pin 162. Such a double pin arrangement may be particularly useful, for example, for use in the mount-bracket pin connections shown in FIG. 11E where the intermediate mount-bracket pin connection 134C is omitted.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:

a turbine engine case including a sidewall, a first mount and a second mount, the sidewall extending axially along and circumferentially about an axis, the first mount and the second mount radially outboard of and fixed to the sidewall, and the second mount circumferentially offset from the first mount about the axis; and an attachment configured to mount the turbine engine case to a pylon structure and transfer one or more loads between the turbine engine case and the pylon structure, the attachment comprising a bracket, the bracket extending laterally between and to a first lateral side and a second lateral side opposing the first lateral side, and the bracket extending radially from a radial inner side to a radial outer side;

the bracket mounted to the first mount through a first mount-bracket pin connection, the first mount-bracket pin connection comprising a first mount-bracket connection pin seated in a first mount-bracket connection aperture having an elongated cross-sectional geometry in a reference plane perpendicular to the axis, and the first mount-bracket connection aperture located at a first corner between the first lateral side and the radial inner side; and the bracket mounted to the second mount through a second mount-bracket pin connection, the second mount-bracket pin connection comprising a second mount-bracket connection pin seated in a second mount-bracket connection aperture having a circular cross-sectional geometry in the reference plane, and the second mount-bracket connection aperture located at a second corner between the second lateral side and the radial inner side.

2. The system of claim 1, wherein the bracket is configured to mount to the pylon structure through a pylon-bracket pin connection such that the attachment is operable to pivot about the pylon-bracket pin connection and move relative to the pylon structure.

3. The system of claim 1, wherein a reference line projects radially out from the axis, the elongated cross-sectional geometry of the first mount-bracket connection aperture comprises a major axis and a minor axis, and the major axis is within five degrees of parallel with the reference line within the reference plane.

4. The system of claim 1, wherein a reference line is coincident with a center of the first mount-bracket pin connection and a center of the second mount-bracket pin connection in the reference plane, the elongated cross-sectional geometry of the first mount-bracket connection aperture comprises a major axis and a minor axis, and the major axis is within five degrees of parallel with the reference line within the reference plane.

5. The system of claim 1, wherein the bracket comprises the first mount-bracket connection aperture.

6. The system of claim 1, wherein at least one of the first mount comprises a first clevis, the bracket is received in a first channel in the first clevis, and the first mount-bracket pin connection attaches the bracket to the first clevis; or the second mount comprises a second clevis, the bracket is received in a second channel in the second clevis, and the second mount-bracket pin connection attaches the bracket to the second clevis.

7. The system of claim 1, further comprising:

a plurality of vanes arranged circumferentially about the axis in an array, each of the plurality of vanes fixed to the turbine engine case;

the turbine engine case circumscribing the array of the plurality of vanes;

the first mount-bracket pin connection circumferentially aligned with a first of the plurality of vanes; and the second mount-bracket pin connection circumferentially aligned with a second of the plurality of vanes.

8. The system of claim 7, wherein the turbine engine case further includes a third mount fixed to the sidewall;

the third mount is arranged circumferentially between the first mount and the second mount about the axis;

the bracket is mounted to the third mount through a third mount-bracket pin connection; and the third mount-bracket pin connection is circumferentially aligned with a third of the plurality of vanes.

9. The system of claim 7, wherein the first of the plurality of vanes is circumferentially next to the second of the plurality of vanes;

the turbine engine case further includes a third mount fixed to the sidewall;

the third mount is arranged circumferentially between the first mount and the second mount about the axis; and the bracket is mounted to the third mount through a third mount-bracket pin connection.

10. The system of claim 7, wherein the first of the plurality of vanes is circumferentially next to the second of the plurality of vanes.

11. The system of claim 7, wherein a third of the plurality of vanes is circumferentially between and next to the first of the plurality of vanes and the second of the plurality of vanes.

12. The system of claim 7, wherein the plurality of vanes are uniformly arranged circumferentially about the axis in the array.

13. The system of claim 7, wherein the plurality of vanes are non-uniformly arranged circumferentially about the axis in the array.

14. The system of claim 1, wherein the turbine engine case further includes a third mount fixed to the sidewall; the third mount is arranged circumferentially between the first mount and the second mount about the axis; and the bracket is mounted to the third mount through a third mount-bracket pin connection, the third mount-bracket pin connection comprises a third mount-bracket connection pin seated in a third mount-bracket connection aperture having a circular cross-sectional geometry in the reference plane.

15. The system of claim 1, wherein at least one of the first mount-bracket connection pin has a solid cross-section in the reference plane, and the first mount-bracket connection pin contacts the first mount and the bracket in the reference plane; or the second mount-bracket pin connection comprises a second mount-bracket connection pin seated in a second mount-bracket connection aperture, the second mount-bracket connection pin has a solid cross-section in the reference plane, and the second mount-bracket connection pin contacts the second mount and the bracket in the reference plane.

16. The system of claim 1, wherein another first mount-bracket connection pin projects through a bore of the first mount-bracket connection pin; or the second mount-bracket pin connection comprises a second mount-bracket connection pin seated in a second mount-bracket connection aperture, and another second mount-bracket connection pin projects through a bore of the second mount-bracket connection pin.

17. The system of claim 1, wherein the turbine engine case comprises an inner turbine engine case, and the system further comprises:

an outer turbine engine case;

a propulsor rotor housed within the outer turbine engine case; and a turbine engine core housed within the inner turbine engine case, the turbine engine core configured to drive rotation of the propulsor rotor.

* * * * *